Figure 7:
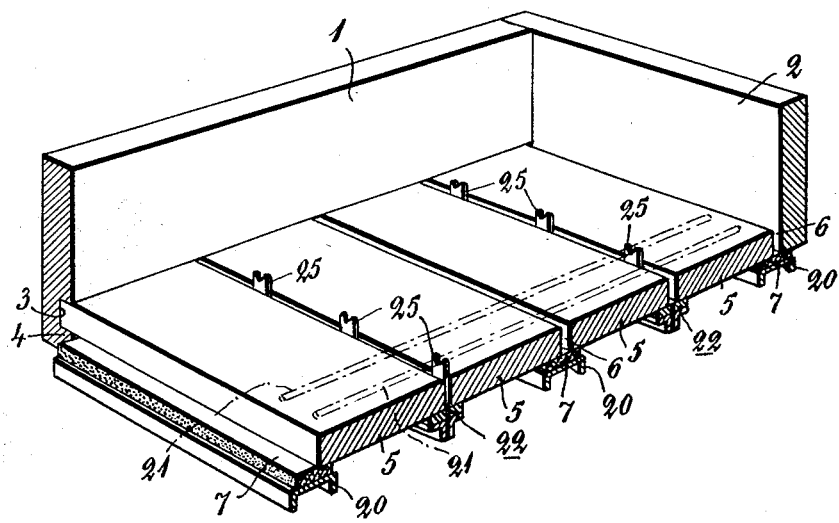

Nov. 23, 1954 K. G. OLSSON ET AL 2,694,846
APPARATUS FOR CUTTING SEMIPLASTIC BODIES
Filed March 31, 1952 3 Sheets-Sheet 1
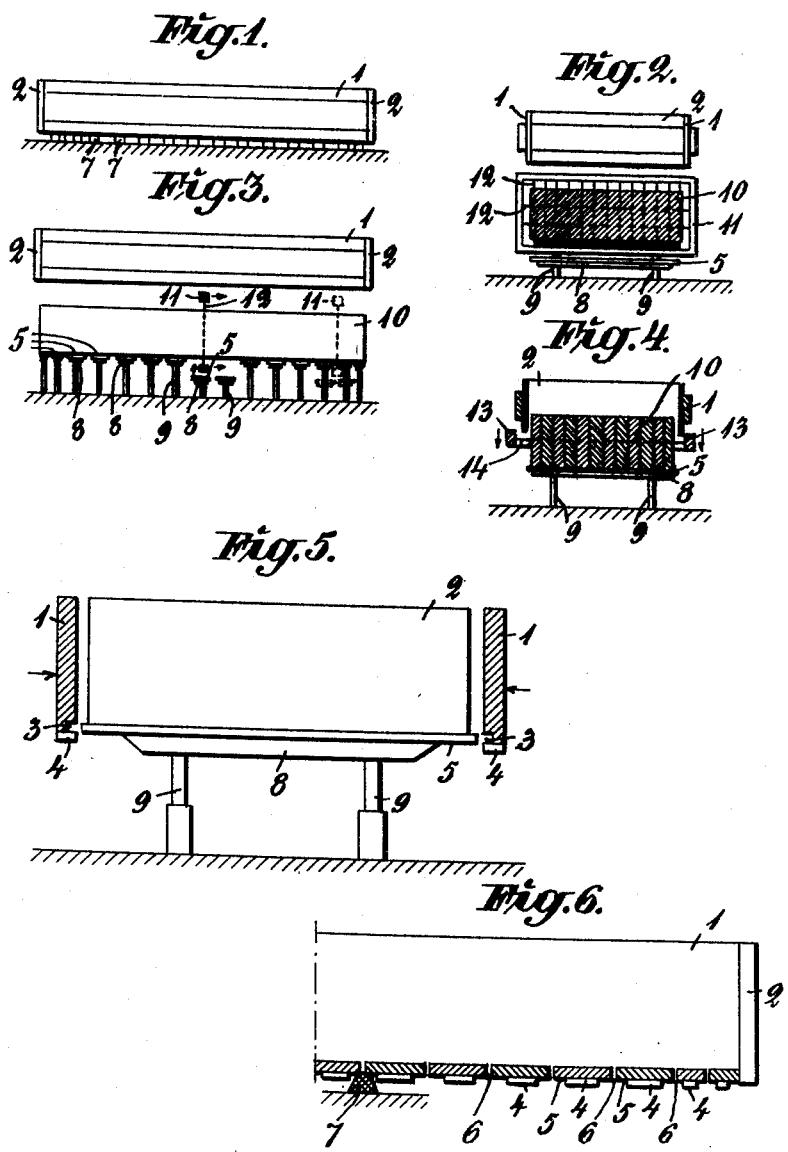
INVENTORS
KARL G. OLSSON AND
ROLF E. GÖRANSSON.
By Henry C. Parker
ATTORNEY Nov. 23, 1954  K. G. OLSSON ET AL  2,694,846
APPARATUS FOR CUTTING SEMIPLASTIC BODIES
Filed March 31, 1952  3 Sheets-Sheet 2

INVENTORS
KARL G. OLSSON AND
ROLF E. GÖRANSSON.
By Henry C. Parker
ATTORNEY

Nov. 23, 1954  K. G. OLSSON ET AL  2,694,846
APPARATUS FOR CUTTING SEMIPLASTIC BODIES
Filed March 31, 1952  3 Sheets-Sheet 3

INVENTORS
KARL G. OLSSON AND
ROLF E. GÖRANSSON.
By Henry C. Parker
ATTORNEY

United States Patent Office 2,694,846
Patented Nov. 23, 1954

2,694,846
APPARATUS FOR CUTTING SEMIPLASTIC BODIES

Karl Gustav Olsson, Solna, and Rolf Erik Göransson, Nacka, Sweden, assignors to Internationella Siporex Aktiebolaget, Stockholm, Sweden, a registered company of Stockholm, Sweden Application March 31, 1952, Serial No. 279,596

Claims priority, application Sweden April 5, 1951

8 Claims. (Cl. 25—105)

This invention relates to means for cutting semi-plastic bodies cast in a mould and more particularly to the production of blocks or slabs of light weight concrete. The invention also includes a mould for casting the plastic bodies which mould is adapted to co-operate directly with said cutting means during the cutting of said bodies.

In the production of building elements of light weight concrete or similar material which is in a semi-plastic state at some phase of production, it is old first to cast a relatively large body and then to cut up this body, when it is in a semi-plastic state, into a number of smaller blocks or slabs. The cutting operation is commonly carried out by means of cutting wires or the like which are tensioned in yokes or frames and caused to pass through the body either in a horizontal or a vertical direction whilst the body rests on a cutting bed on which it has been deposited by dismantling the mould in which the body was cast and in which it was also transported to the cutting bed. The cutting bed commonly comprises a number of slightly spaced bars arranged in parallel in the longitudinal direction of the bed and surrounded by a frame which is displaceable along the bars and carried a plurality of cutting strings tensioned between two opposite sides of the frame so as to extend through the gaps between the bars of the cutting bed. However, in such known cutting plants it is difficult to remove the frame carrying the cutting strings from the cutting bed on account of the support required by the bars at their ends, whereby the exchanging of the cutting strings in the frame is rendered more difficult and furthermore, the known plant presents considerable difficulties when it is required to cut up the body in a number of directions running transversely to one another.

The present invention has for its object to overcome these drawbacks and to provide cutting means including a cutting bed and a horizontally movable and substantially vertical frame having cutting members tensioned therein, wherein the said frame is adapted to pass with its one side on the underside of the body and more particularly between the body and the cutting bed. According to the invention this is effected by providing a cutting bed comprising a number of sections arranged substantially parallel to the plane of the frame and by providing means for individual and progressive withdrawal of said sections from the underside of the body to form a passage for the lower frame side. The sections are preferably separated by intermediate spaces or gaps to permit the cutting of the body by means of through cuts parallel to the sections in a manner known per se, with the help of a vertically movable frame having horizontal cutting members, horizontally movable yokes with vertical cutting members or the like.

The invention also includes a constructional embodiment wherein each bed section in turn is divided up into a number of supporting surfaces or heads which are each adapted to be withdrawn individually from contact with the underside of the body to permit the cutting up of the body in the manner described above, in two directions running transversely to one another, the separate supporting surfaces or heads then alternatively forming parts of transverse cutting bed sections which, when cutting in each direction, are at right-angles to the cuts produced.

Although it is, of course, possible to construct the plant in such a way, that the frame with the cutting members remains stationary whilst the cutting bed is moved together with the body resting on it, it has been found more practical to make the cutting bed stationary and to allow the frame to move. In both cases the frame and the bed are preferably so arranged that a relative movement between them causes the different sections of the bed to progressively leave the underside of the body immediately in front of the frame in its direction of movement and to return to the body-supporting position immediately behind the frame. The section may, of course, be inter-connected in a suitable manner and they may be controlled by mechanical, hydraulic or pneumatic actuators to execute their movements.

Since the semi-plastic body is supported by the bed sections both in front of and behind the cutting frame, it has been found possible to construct the sections with a relatively great width in the frame's direction of movement, but in the vicinity of the body's end portions an overhang is thereby obtained at the beginning and the conclusion of cutting, that is to say, the body will project freely beyond the active bed, and should this overhang become too great, a risk of breakage at the body's end portions will arise. This problem may be solved in different ways, one way being to construct the sections with a smaller width close to the ends of the bodies, and another, preferred, way being to provide particular means for supporting the ends of the body as will be hereinafter more fully described and shown.

As will be understood by what has been said above, the bodies are cast in moulds in which they are transported to the cutting bed. With regard to the division of this cutting bed into individually movable sections it has consequently been found preferable also to provide the mould with a bottom divided into separable bottom sections, these sections being held together by means of detachable side walls for the mould in a manner known per se. The bottom sections may thus be adapted to the cutting bed sections so that, on the detachment and removal of the side walls of the mould, they can form individually movable plates, corresponding to the cutting bed sections, between the cutting bed and the body and be removed from the underside of the body together with the corresponding cutting bed sections.

The invention is shown diagrammatically on the accompanying drawing in which Figs. 1–4 illustrate different stages in the production of light weight concrete building blocks with the help of the cutting means and the mould according to the invention, while Figs. 5 and 6 show the mould to an enlarged scale Fig. 5 being a cross-section and Fig. 6 a partial longitudinal section.

Figure 8:
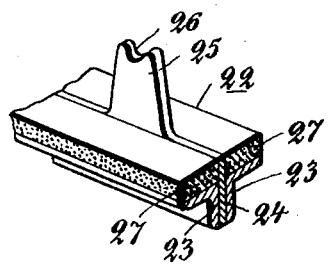
Figure 9:
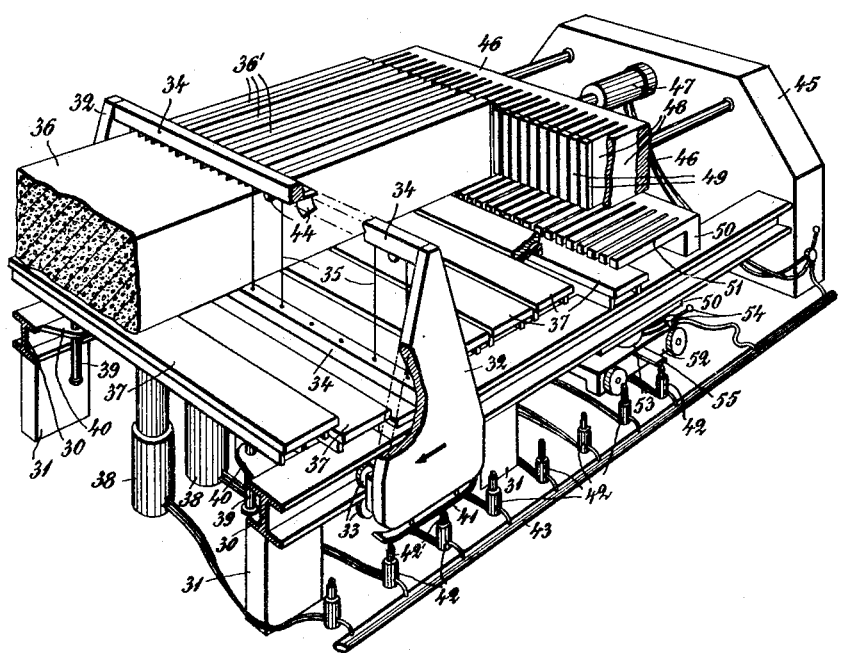

Fig. 7 is a perspective view of a mould according to the invention, and Fig. 8 shows a part of a bottom sealing bar for the mould according to Fig. 7. Finally, Fig. 9 is a perspective view of a more structural embodiment of a cutting apparatus according to the invention.

It should perhaps be mentioned that the cutting device can also be employed when the body to be cut has not been cast in the mould shown, but the said mould facilities the work in a high degree.

In Fig. 1 a mould is shown which consists of two parallel longitudinal side walls 1 and two end walls 2. As may be seen from Figs. 5 and 6 the longitudinal side walls are provided on the inside at their lower edge with longitudinal grooves 3 and claws 4 projecting below these grooves. A number of bottom sections 5 extend between the longitudinal side walls 1, which sections, when the longitudinal side walls have been assembled to form a closed moulding frame together with the end walls 2, penetrate into the grooves 3 at their ends and are retained in the same by the claws 4. The longitudinal side walls 1 and end walls 2 may be detached in a manner known per se. The bottom sections 5 are separated by the gaps 6 which are adapted to permit the downward movement of the horizontal cutting member between the bottom sections 5 in a manner to be described later, and on the casting of the body in the mould these gaps 6 are closed by tightening strips 7 which are laid on a suitable support.

After the body has been cast in the mould and has assumed a semi-plastic state suitable for the cutting operation it is transported in the mould to a cutting bed (see Figs. 2 and 3). This cutting bed consists of a number of parallel longitudinal sections 8 which are supported by hydraulic lifting devices 9 for example. These cutting bed sections 8 correspond to the bottom sections 5 of the mould and the bottom sections 5 are guided by and can be secured if necessary to the cutting bed sections 8. The cutting bed sections 8 are separated by gaps or spaces like the bottom sections and with the help of the lifting devices 9 the cutting bed sections 8 can move individually in a vertical direction so that they can be removed together with the bottom sections 5 from the underside of the cast body 10 resting on the bed.

The cutting of the body 10 in the longitudinal direction is now effected with the aid of a horizontally movable vertical frame 11 with cutting members 12, the plane of the frame being parallel to the longitudinal direction of the cutting bed sections 8 and the frame's direction of movement at right-angles to the latter. On the horizontal movement of the frame 11 over the body 10 the cutting bed sections 8 are adapted to be lowered progressively in front of the frame and to be raised again directly behind the frame to the original position for again supporting the body 10. By this means the frame 11 can pass with its lower side portion located under the body 10 between the body 10 and the cutting bed. When the longitudinal cut has been completed in the manner now described, transverse cutting may be effected with the help of a vertically movable frame 13 with transverse cutting members 14 which are caused to pass through the body from the top downwards, if so desired in conjunction with the replacing of the mould walls in position, as may be seen from Fig. 4. The cutting members 14 in the frame 13 pass down through the gaps 6 between the bottom sections 5 and between the cutting bed sections 8, whereupon the mould is replaced and the cut-up body 10 is transported in the mould to an autoclave for steam hardening. As mentioned previously, transverse cutting can, of course, be effected in some other manner than that here indicated and if desired, in a corresponding manner to the longitudinal cut, in which case the cutting bed should comprise a plurality of substantially square heads arranged on movable stems in parallel rows so as to form a chest-board with individually movable squares, which may cooperate to form the longitudinal bed sections 8 above described.

Fig. 7 shows in greater detail how the mould equipped with separable bottom sections 5 is tightened against a base during casting by placing the mould on a number of U-beams 20 which run parallel with the sections 5 and support the tightening strips 7 of sponge rubber which close the gaps 6 between the sections. When reinforced lightweight concrete blocks or slabs are to be produced it is desirable to primarily fix the reinforcing irons 21 in the mould before the concrete mass is poured in and till the mass has solidified sufficiently to retain the reinforcing irons in position by itself. For this purpose a special bottom sealing bar 22 is employed as a substitute for some of the U-beams 20 with the tightening strips 7. As particularly shown in Fig. 8 these sealing bars 22 are built up from two angle-irons 23 placed against one another with an intermediate cam 24 which at certain intervals is shaped to form a lug 25 projecting between the bottom sections and which is provided at the top with a groove 26 in which the reinforcing irons 21 can rest. On both sides of the cam 24 sponge rubber strips 27 are arranged which are fixed to one flange of each angle-iron 23. By construction of the bars 22 in such a way that they may be clamped to the longitudinal sides 1 of the mould between the bottom sections 5, the bar 22 may be mounted in position before the mould is placed on the casting bed which also permits the reinforcing irons to be positioned in the mould in advance without occupying space on the casting bed during this work. When the mass has solidified in the mould so that the mould may be lifted away from the casting bed, the sealing bars 22 may also be removed, and this must, of course, be done under all circumstances before the mould is transported to the cutting bed and dismantled to allow the cast body to be cut up.

To facilitate an easy understanding of the invention and the manner in which it can be practically applied, a more structural form of an apparatus for cutting semi-plastic bodies according to the invention is shown in Fig. 9. In this figure 30 indicates two parallel I-beams which are mounted horizontally and fixed to supporting plinths 31. Each of the I-beams 30 serves as a rolling track for a carriage 32 with running and guide wheels 33. The two carriages 32 are rigidly connected to each other by a frame 34 which carries vertical, tensioned cutting wires 35. The carriages 32 are moved along the I-beams 30 during the cutting operation in such a way, so that the frame 34 with the cutting wires 35 is caused to divide the semi-plastic body 36 in its longitudinal direction. The body 36 rests on vertical, movable sections 37 which run transversely between the I-beams 30 and are each actuated by means of a pneumatic operating cylinder 38 which is centrally located under each section. In order to prevent the sections from turning they are provided at the ends with guide pins 39 which pass down vertically through guide lugs 40 at the flanges of the I-beams 30.

One of the carriages 32 is provided at its lower portion with a rocker 41 which is adapted to cooperate with a series of control valves 42 which regulate the flow of air under pressure from a longitudinal air supply pipe 43 to each of the operating cylinders 38. When an actuating pin $42^1$, which projects from the upper side of the control valve and is provided with a runner, is depressed by the rocker 41 during the movement of the carriage 32, the corresponding section 37 is lowered and the section is held down as long as the rocker actuates the pin $42^1$ of the corresponding control valve. With this arrangement the sections 37 are lowered progressively as soon as the frame 34 approaches them, and they subsequently rise again, when the frame has passed. Thus, the frame 34 will always surround the body 36 closely, and consequently the body may, of course, also be worked in some other way while cutting is prosecuted, for example, grooves $36^1$ may be formed in the surface of the body with the help of bowshaped knives 44 mounted on the upper part of the frame 34. Knives of this kind may, of course, also be mounted on the lower part of the frame. In this way subsequent work on the cut-blocks or slabs can be considerably simplified.

It has been mentioned already that the cutting up of the end portion of the semi-plastic body may in many cases give rise to difficulties owing to the frequently unsatisfactory supporting capacity of the end portion which projects freely in a horizontal direction. In the form of construction according to Fig. 9 this problem has been solved without employing any narrower underlying sections at the end of the cutting bed. Instead of such narrower sections a base structure 45 is arranged at the end of the cutting bed which structure supports a movable vertically slotted, comb-shaped counter-member of supporting block 46 which may be pressed against the end of the body 36 by means of a pneumatically operated cylinder 47. The teeth 48 of the counter-member 46 are laminated and are provided at the vertical edge turned towards the body 36 with sponge rubber strips 49 which provide a soft but firm support for the end of the body 36. The teeth 48 of the counter-member are of narrow width to permit great freedom in the location of the cutting wires 35 which should pass between the teeth 48 before cutting begins.

To provide further support for the end of the body 36 at the beginning and conclusion of cutting and in other respects, if so desired, a grate-shaped support 50 may be employed during the whole cutting operation, which is provided with an upper horizontal top plate or comb 51 having a number of teeth corresponding to the teeth 48 on the counter-member 46. The support 50 is carried by a truck 52 which can be raised and lowered by means of two pneumatic cylinders 53 which are operated manually by a valve 54. The truck 52 is fitted with a wing 55 which holds down the outermost section 37 on the cutting bed by actuating the corresponding valve 42.

A supporting block 46 and a support 50 are, of course, employed at each end of the cutting-bed and the arrangement is utilized in such a way that the body 36 is first placed on the sections 37 when all the latter are raised, whereupon the counter-members 46 are pressed against the ends of the body 36. Then the outermost sections 37 are lowered and the grate-shaped supports 50 rolled in and raised slightly so that the ends of the block rest on the respective toothed supporting plates 51. During the whole of this operation the carriages 32 with the frame 34 has been pushed in such a distance over the counter-member 46 that the cutting wires 35 run down between the corresponding laminated teeth 48 on the countermember and the corresponding teeth on the grate-shaped supports 50 horizontal plate 51, the lower side portion of the frame 34 being then located immediately under the plate 51. After the ends of the body 36 have been supported in this manner, the carriages 32, and consequently the frame 34 and the cutting members 35 and 44 are set in motion, thus cutting the body.

The movable unit formed by the carriages 32 and the frame 34 may advantageously be equipped with a driving motor which moves the unit at a uniform speed along the I-beams. It may also include arrangements for setting the cutting wires 35 in movement, which may suitably be effected with the help of an electric or like vibrator rigidly mounted on the unit. The detailed construction of the installation as well as the size and arrangement of the parts may, of course, be varied by persons skilled in the art, without departing from the purview of the invention.

We claim:

1. In an apparatus for cutting semi-plastic bodies cast in a mould the combination of a cutting bed for receiving the semi-plastic body to be cut, said bed comprising a plurality of spaced parallel transverse sections, individual jack means for vertical adjustment of each of said bed sections, a substantially vertical cutting frame having a lower side portion transversing said cutting bed, means for carrying said cutting frame with its lower side portion just below the upper surface of said cutting bed, means for moving said frame and said frame carrying means along said cutting bed, cutting members arranged in said frame to cut said body at the movement of said frame, means for controlling the operation of said jack means and means on said frame carrying means for actuating said controlling means so as to progressively lower said bed sections individually just in front of said moving frame to allow for the passage of said lower side portion of said frame immediately underneath said body to be cut and between the bottom side of said body and the top of said lowered individual bed sections, and to progressively elevate said bed sections individually after the passage of said frame thereover to restore said sections into body-supporting position.

2. In an apparatus for cutting blocks of semi-plastic bodies cast in a mould, the combination of a cutting bed for receiving the semi-plastic body to be cut, said bed comprising a plurality of vertically adjustable, transverse and slightly spaced apart sections, a substantially vertical cutting frame having a lower side portion transversing said cutting bed, means for carrying said cutting frame with its lower side portion just below the upper surface of said cutting bed, means for effecting a relative movement between said frame and said cutting bed in the longitudinal direction of said bed, cutting members arranged in said frame to cut said body during said relative movement, and height adjusting means for individually lowering each of said bed sections progressively just in front of said frame to allow the passage of said lower side portion of said frame immediately underneath said body to be cut and for again individually elevating said bed sections just behind said frame in successive order to restore said sections into body-supporting position under the parts of said body just cut, whereby the body retains its original block form although subdivided.

3. The cutting apparatus of claim 12 wherein means are provided for supporting the longitudinal ends of the semi-plastic body, said means comprising transverse supporting blocks mounted at either end of the cutting bed and provided at their inner faces with vertical slots to receive the cutting members of the cutting frame, means for moving said supporting blocks towards the cutting bed so that their inner faces abut the end faces of the semi-plastic body, bottom supporting plates mounted horizontally beneath said supporting blocks, the inner ends of said plates being provided with protruding teeth so that the cutting members of the cutting frame can be received therebetween, means for reciprocating the plates towards and away from the cutting frame and means for depressing the end sections of the cutting bed when said supporting plates are moved towards the cutting bed so that the teeth of said plates are moved above said depressed sections and beneath the ends of the semi-plastic body to support said ends during the cutting operation, said plates being so constructed and arranged that sufficient space is left beneath their teeth so that the lower side portion of the cutting frame can pass beneath said teeth during and previous to the cutting operation.

4. In an apparatus for cutting semi-plastic bodies cast in a mould the combination of a cutting bed for receiving the semi-plastic body to be cut, said bed comprising a plurality of spaced transverse sections, individual pressure fluid operated jack means for vertical adjustment of each of said bed sections, a substantially vertical cutting frame transversing said cutting bed, means for carrying said cutting frame with its lower side portion just below the upper surface of said cutting bed, means for moving said frame and said frame carrying means along said cutting bed, cutting members arranged in said frame to cut said body at the movement of said frame, valve means for controlling the operation of said jack means and means on said frame carrying means for actuating said valve means so as to progressively lower said bed sections individually just in front of said moving frame to allow for the passage of said lower side portion of said frame immediately underneath said body to be cut and between the bottom side of said body and the top of said lowered individual bed sections, and to progressively elevate said bed sections individually after the passage of said frame thereover to restore said sections into body-supporting position.

5. In an apparatus for cutting semi-plastic bodies cast in a mould the combination as claimed in claim 1 wherein aiding means are provided for supporting the end portions of said semi-plastic body resting on said cutting bed, said aiding means comprising a vertically grooved dolly, means for pressing said dolly against the end edge of said semi-plastic body, and a movable grate having a comb-like top plate and means for vertical adjustment of said top plate.

6. In an apparatus for cutting semi-plastic bodies cast in a mould the combination as claimed in claim 1 wherein said individual spaced bed sections comprise separate top sections adapted to be interconnected by side and end members to form a mould for the casting of said semi-plastic bodies.

7. A mould for casting semi-plastic bodies to be cut in the apparatus claimed in claim 1 comprising a plurality of spaced parallel bottom sections releasably secured to vertical side and end members to form individually movable top sections on corresponding bed sections of said cutting apparatus.

8. A mould for casting semi-plastic bodies as claimed in claim 7, wherein means are provided to seal the spaces between adjacent bottom sections during the casting operation, said means comprising sealing bars having projections entering the mould through said spaces adapted to carry reinforcing irons to be included in the cast body.

References Cited in the file of this patent

UNITED STATES PATENTS

| Number | Name | Date |
|---|---|---|
| 548,821 | Simpson | Oct. 29, 1895 |